US010089239B2

(12) United States Patent
Knies et al.

(10) Patent No.: US 10,089,239 B2
(45) Date of Patent: Oct. 2, 2018

(54) MEMORY SYSTEM ARCHITECTURE

(71) Applicant: GOOGLE INC., Mountain View, CA (US)

(72) Inventors: Allan D. Knies, Burlingame, CA (US); Shinye Shiu, Los Altos, CA (US); Chih-Chung Chang, Taipei (TW); Vyacheslav Vladimirovich Malyugin, Los Gatos, CA (US); Santhosh Rao, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/165,839

(22) Filed: May 26, 2016

(65) Prior Publication Data
US 2016/0350232 A1 Dec. 1, 2016

Related U.S. Application Data

(60) Provisional application No. 62/166,993, filed on May 27, 2015.

(51) Int. Cl.
*G06F 12/08* (2016.01)
*G06F 12/10* (2016.01)
(Continued)

(52) U.S. Cl.
CPC ...... *G06F 12/0893* (2013.01); *G06F 12/0888* (2013.01); *G06F 12/0891* (2013.01); *G06F 12/1045* (2013.01); *G06F 12/084* (2013.01); *G06F 12/127* (2013.01); *G06F 2212/1016* (2013.01); *G06F 2212/604* (2013.01); *G06F 2212/6046* (2013.01); *G06F 2212/68* (2013.01)

(58) Field of Classification Search
CPC ............... G06F 12/084; G06F 12/0888; G06F 12/0891; G06F 12/0893; G06F 12/1045; G06F 12/127; G06F 2212/1016; G06F 2212/604; G06F 2212/6046; G06F 2212/68
See application file for complete search history.

(56) References Cited

U.S. PATENT DOCUMENTS 7,266,538 B1      9/2007  Shatil
2006/0112233 A1*  5/2006  Hu ...................... G06F 12/0888
                                                711/138
(Continued)

OTHER PUBLICATIONS

International Search Report and Written Opinion for International Application No. PCT/US2016/034360 dated Aug. 10, 2016.
(Continued)

*Primary Examiner* — Aracelis Ruiz
(74) *Attorney, Agent, or Firm* — Colby Nipper

(57) ABSTRACT

Provided are methods, systems, and apparatus for managing and controlling memory caches, in particular, system level caches outside of those closest to the CPU. The processes and representative hardware structures that implement the processes are designed to allow for detailed control over the behavior of such system level caches. Caching policies are developed based on policy identifiers, where a policy identifier corresponds to a collection of parameters that control the behavior of a set of cache management structures. For a given cache, one policy identifier is stored in each line of the cache.

18 Claims, 7 Drawing Sheets

(51) Int. Cl.
*G06F 12/12* (2016.01)
*G06F 12/0893* (2016.01)
*G06F 12/0891* (2016.01)
*G06F 12/1045* (2016.01)
*G06F 12/0888* (2016.01)
G06F 12/084 (2016.01)
G06F 12/127 (2016.01)

(56) References Cited

U.S. PATENT DOCUMENTS

2006/0179259 A1* 8/2006 Kershaw ............. G06F 12/1081
  711/154
2008/0177952 A1* 7/2008 Morrow ............... G06F 12/121
  711/133
2011/0055489 A1* 3/2011 Reddy ................. G06F 12/0831
  711/141
2014/0075117 A1 3/2014 Tripathi et al.

OTHER PUBLICATIONS

Mazen Kharbutli et al, "SCIP: Selective Cache Insertion and Bypassing to Improve the Performance of Last-Level Caches", 2013 IEEE Jordan Conference on Applied Electrical Engineering and Computing Technologies (AEECT), Dec. 3, 2013, pp. 1-6, XP032552524.

"Preliminary Report on Patentability", PCT Application No. PCT/US20161034360, dated Dec. 7, 2017, 7 pages.

* cited by examiner

| | | | |
|---|---|---|---|
| 310 — | uint32 | bloom_refresh_cycles_counterA<br>bloom_refresh_cycles_counterB | Blacklist – stop a given line from being allocated |
| 311 — | uint32 | bloom_refresh_cycles_limit | Blacklist – stop a given line from being allocated |
| 312 — | #define<br>bit_t<br>bit_t | N_FILTER_BITS<br>filterA[ N_FILTER_BITS ]<br>filterB[ N_FILTER_BITS ] | e.g., 8K – 16K<br>Remember the filter state, copy A<br>Remember the filter state, copy B |
| | int6 | access_count_threshold | Threshold for blacklisting a page |
| 314 — | int2 | blacklist_alloc_policy | Load 0B (no_alloc), 128B, 256B, or 512B subline<br>(only load a subblock, not the entire line)<br>(could be used if blacklist fails; will throttle bad lines) |
| 316 — | bit_t | use_blacklist | Turn blacklist on/off |
| 318 — | int | blocks_used_threshold | Used for training the blacklist |
| 322 —<br>323 —<br>324 — | bit_t<br>bit_t<br>bit_t | allocate_on_read<br>allocate_on_write<br>partial_allocate_on_write | Allocation policy |
| 325 — | bit_t | victim_selection | Used to select victim policy when quota is reached |
| 326 —<br>327 — | int<br>int | line_count_max<br>line_count | (Used for quota control)<br>Max lines this stream can allocate in cache<br>Number of lines already allocated to this PID |
| 328 —<br>329 — | int<br>int | subblock_size<br>access_count_threshold | (To reduce impact of not-fully-utilized cache lines)<br>Size of subblocks to allocate for non-blacklisted lines<br>How many accesses before filling entire line |
| 332 — | int | access_count | Increment every time line is accessed<br>(cleared at allocation) |
| 334 — | int | PID | The PID that determines policy for this cache line |
| 340 — | bit_t | accessed | Indicates if this subblock was accessed after it was allocated |

FIG. 3

MEMORY SYSTEM ARCHITECTURE

The present application claims priority to U.S. Provisional Patent Application Ser. No. 62/166,993, filed May 27, 2015, the entire disclosure of which is hereby incorporated by reference.

BACKGROUND

The development of caches and caching has significantly increased in recent years, and just about every modern CPU core from ultra-low power chips to higher-end microcontrollers use caches, or at least offer them as options. The performance benefits of caches are too great to ignore, even in ultra-low power designs. CPU caches are small pools of memory that store information the CPU is most likely to need next. The goal of caches is to ensure that the CPU has the next bit of data that it will need already loaded into cache by the time the CPU goes looking for it.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to computer memory systems. More specifically, aspects of the present disclosure relate to efficient and effective management of memory cache operations.

One embodiment of the present disclosure relates to a method comprising: receiving a request for access to a system memory cache; determining a policy identifier specified for a cache line associated with the request for access, wherein the policy identifier corresponds to at least one policy for controlling operations of the system memory cache; and performing a control operation on the system memory cache based on the at least one policy corresponding to the policy identifier.

In another embodiment, the control operation includes one of cache line filtering, cache line allocation, and cache line eviction.

In another embodiment, the request for access includes a policy identifier associated with a hardware device from which the request for access originated, and the method further comprises: determining that the policy identifier included in the request for access matches the policy identifier specified for the cache line associated with the request for access.

In another embodiment, the control operation in the method includes cache line filtering, and the cache line filtering includes: identifying the cache line has a utilization level below a threshold value; and preventing the identified cache line from being subsequently loaded into the system memory cache.

In another embodiment, the cache line filtering in the method further includes adding the identified cache line to a set of cache lines prevented from being loaded into the system memory cache.

In yet another embodiment, identifying the cache line has a utilization level below a threshold value in the method includes: comparing an access count of number of times the cache line is accessed to a threshold count associated with a policy of the cache line filtering; and responsive to the access count being less than the threshold count, adding the cache line to the set of cache lines prevented from being loaded into the system memory cache.

In still another embodiment, identifying the cache line has a utilization level below a threshold value in the method includes: examining individual accessed bits of subblocks of the cache line to determine a number of subblocks accessed within the cache line; comparing the number of subblocks accessed to a threshold value associated with a policy of the cache line filtering; and responsive to the number of subblocks accessed being less than the threshold value, adding the cache line to the set of cache lines prevented from being loaded into the system memory cache.

In yet another embodiment, the control operation in the method includes cache line filtering, and the cache line filtering includes: using a bloom filter to filter out one or more lines of the system memory cache based on the one or more cache lines having utilization levels below a threshold value; and adding the filtered out cache lines to a set of cache lines prevented from being loaded into the system memory cache.

Another embodiment of the present disclosure relates to a system including system cache memory; system memory; at least one processor coupled to the system memory and the system cache memory; and a non-transitory computer-readable medium associated with the at least one processor, the non-transitory medium having instructions stored thereon that, when executed by the at least one processor, causes the at least one processor to: receive a request for access to the system cache memory; determine a policy identifier specified for a cache line associated with the request for access, wherein the policy identifier corresponds to at least one policy for controlling operations of the system cache memory; and perform a control operation on the system cache memory based on the at least one policy corresponding to the policy identifier.

In another embodiment, the at least one processor in the system is further caused to perform, as the control operation, one of cache line filtering, cache line allocation, and cache line eviction.

In another embodiment, the request for access includes a policy identifier associated with a hardware device from which the request for access originated, and the at least one processor in the system is further caused to: determine that the policy identifier included in the request for access matches the policy identifier specified for the cache line associated with the request for access.

In another embodiment, the control operation includes cache line filtering, and the at least one processor is further caused to: identify the cache line has a utilization level below a threshold value; and prevent the identified cache line from being subsequently loaded into the system cache memory.

In another embodiment, the at least one processor in the system is further caused to: add the identified cache line to a set of cache lines prevented from being loaded into the system cache memory.

In yet another embodiment, the at least one processor in the system is further caused to: compare an access count of number of times the cache line is accessed to a threshold count associated with a policy of the cache line filtering; and responsive to the access count being less than the threshold count, add the cache line to the set of cache lines prevented from being loaded into the system cache memory.

In still another embodiment, the at least one processor in the system is further caused to: examine individual accessed bits of subblocks of the cache line to determine a number of subblocks accessed within the cache line; compare the number of subblocks accessed to a threshold value associated with a policy of the cache line filtering; and responsive to the number of subblocks accessed being less than the threshold value, add the cache line to the set of cache lines prevented from being loaded into the system cache memory.

In still another embodiment, the control operation includes cache line filtering, and the at least one processor is further caused to: use a bloom filter to filter out one or more lines of the system cache memory based on the one or more cache lines having utilization levels below a threshold value; and add the filtered out cache lines to a set of cache lines prevented from being loaded into the system cache memory.

In one or more other embodiments, the methods and systems of the present disclosure may optionally include one or more of the following additional features: the control operation is one of cache line filtering, cache line allocation, and cache line eviction; the policy identifier indexes a table containing a plurality of policies for controlling operations of the system memory cache; the policy identifier is included in the request for access using physical address bits; the policy identifier is associated with one or more pages in a memory management unit or a translation lookaside buffer; the policy identifier is associated with one or more computational engines from which the request for access originates; the policy identifier specified for the cache line is one of a plurality of policy identifiers, and each cache line in the system memory cache specifies one policy identifier of the plurality; and/or the policy identifier specified for each cache line is based on a source associated with a most recent request for access to the cache line.

It should be noted that embodiments of some or all of the processor and memory systems disclosed herein may also be configured to perform some or all of the method embodiments disclosed above. In addition, embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the methods and systems of the present disclosure will become apparent from the Detailed Description given below. However, it should be understood that the Detailed Description and specific examples, while indicating embodiments of the methods and systems, are given by way of illustration only, since various changes and modifications within the spirit and scope of the concepts disclosed herein will become apparent to those skilled in the art from this Detailed Description.

BRIEF DESCRIPTION OF DRAWINGS

These and other objects, features, and characteristics of the present disclosure will become more apparent to those skilled in the art from a study of the following Detailed Description in conjunction with the appended claims and drawings, all of which form a part of this specification. In the drawings:

FIG. 3 illustrates example logical state for a cache controller according to one or more embodiments described herein.

Figure 1:
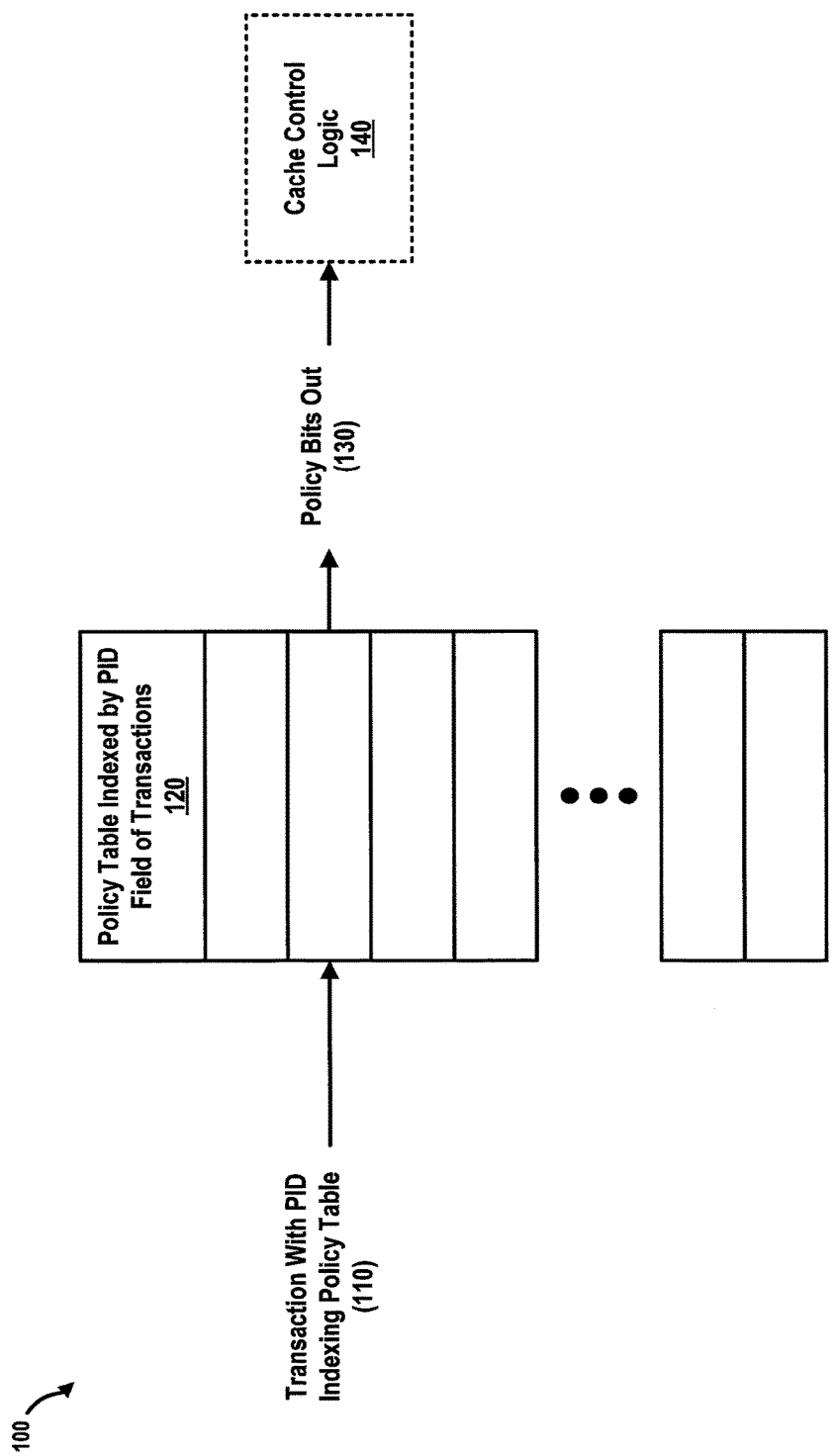
FIG. 1 is a block diagram illustrating an example high-level operation of using policy identifiers to control memory cache operations according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments of the methods and systems of the present disclosure will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include other features not described in detail herein. Additionally, some well-known structures or functions may not be shown or described in detail below, so as to avoid unnecessarily obscuring the relevant description.

In the present disclosure, the terms "application" and "program" may include files having executable content such as, for example, object code, scripts, markup language files, byte code, and the like. An "application" may also include files that are not necessarily executable, such as, for example, documents or other data files that need to be accessed or otherwise opened.

The terms "component," "module," "system," "database," and the like, as used herein, refer to a computer-related entity, which may be, for example, hardware, software, firmware, a combination of hardware and software, or software in execution. A "component" may be, for example, but is not limited to, a processor, an object, a process running on a processor, an executable, a program, an execution thread, and/or a computer. In at least one example, an application running on a computing device, as well as the computing device itself, may both be a component.

It should also be noted that one or more components may reside within a process and/or execution thread, a component may be localized on one computer and/or distributed between multiple (e.g., two or more) computers, and such components may execute from various computer-readable media having a variety of data structures stored thereon.

Embodiments of the present disclosure relate to methods, systems, and apparatus for managing and operating memory caches, in particular, system level caches outside of those closest to the CPU. Such system caches are typically designed separately from the CPU as part of the design progress and then linked to other components via common bus architectures much the way other loosely connected components of a computer system are connected such as, for example, North/South bridge architectures, I/O devices, and IP blocks on "System on Chip" (SoC) design. As will be described in greater detail herein, the present disclosure provides processes and representative hardware structures that implement the processes designed to allow for detailed control over the behavior of these general system level caches.

When used herein in the context of a bit or field, the terms "clear" and "cleared" indicate that the value is zero or will be set to zero. When used herein in the context of a bit or field, the term "set" indicates that the value is one or will be set to one. It should also be understood that, unless expressly indicated otherwise, all arithmetic in the present disclosure is saturating to the minimum and maximum values of counters.

In accordance with one or more embodiments of the present disclosure, it may be assumed that the configuration states needed to control various aspects of cache management and operations are stored centrally in the cache controllers themselves. It should be noted, however, that an implementation based on distributed storage, distributed copies, or cached copies does not fundamentally change the various cache control features described herein.

In addition, one or more embodiments assume that one or more structures (e.g., tables) exist, each of which holds a collection of policies or parameters for controlling various operations and/or features of a cache (e.g., cache management policies, cache management parameters, etc.). As will be described in greater detail below, these structures are indexed (e.g., associatively or directly) by an identifier referred to as a policy ID (PID).

As used herein, a PID is a name (e.g., identifier, number, etc.) given or assigned to a collection of parameters that control the behavior of a set of cache management structures. The various features and functionality of the cache management methods and systems provided herein are not dependent on or otherwise impacted by the precise representation of a PID. As a general concept, a PID may be any identifying value (typically a number), that is either present in the system already or one that software can construct explicitly. For purposes of the methods, systems, and apparatus of the present disclosure, any value that provides insight into the initiator or requestor of a memory transaction (e.g., CPU0, CPU1, GPU core 0, GPU shared core 5, video encoder, video decoder, or typically any bus master) may be used as a suitable PID. Thus, the present disclosure allows for several possible approaches to building a PID, which may be illustrated by the following, non-limiting, representative examples:

(1) Use a hardware identifier (a "HW ID") of the requestor unit in a system on chip (SoC). For example, in typical SoCs, the value is transmitted with each transaction as part of existing protocols.

(2) Use a context ID (which is sometimes called an address space ID). This is an ID that an application or program negotiates with the translation lookaside buffers (TLBs)/memory management units (MMUs) that the program can use to generate per-page permissions and behaviors.

(3) Use an entirely program-generated "address space identifier" that HW structures hold, transmit, and interpret with requests out of band with respect to the normal transaction payload and control information.

FIG. 1 is a high-level operation 100 of using PIDs at the cache level in accordance with one or more embodiments described herein. For example, PIDs may be used to determine cache control logic 140 and direct various memory cache operations.

PIDs may be attached to (e.g., included with) requests/transactions (110) between requestors and memory structures (e.g., main memory, scratch buffers, or cache memory), where a requestor may be, for example, any device hardware requesting access to the system cache, and may for example be a central processing unit (CPU), such as CPU0 or CPU1, a general processing unit (GPU), such as GPU core 0 or GPU shared core 5, a video encoder, a video decoder, any bus master, or the like. The PID included with a request/transaction (110) indexes a corresponding policy table 120 containing policies designed to control various aspects and/or operations of the memory cache. For example, as a result of the PID being used to reference the corresponding policy table 120, policy bits (130) may be output (e.g., generated, provided, etc.) based on one or more policies determined to be applicable to the cache given the particular circumstances. Such policy bits (130) may be used to control/determine various logic of the cache 140 (e.g., the cache controller).

It should be noted that the transport mechanisms for the PIDs may vary based on the particular implementation, and that the present disclosure is in no way limited by the example transport mechanisms described below. For example, in accordance with at least one embodiment, unused (e.g., upper) portions of the physical address bits may be used to transport PIDs to the memory cache. In such an example, the associated application or program would manage the PIDs, and TLBs and caches would store the unused bits, but could otherwise ignore their content for purposes of all other addressing functionality. In another example, the various devices of the system that reference memory may be modified so as to automatically copy the PID from its source (e.g., a MMU of the system) into extra user-defined bits in the applicable protocol that is used (e.g., such bits are typically available in network on chip protocols).

The present disclosure provides techniques for the development of caching policies based on PIDs. For example, a memory cache will receive a PID from its transport mechanism and interpret the PID in the manner further described below. In at least one embodiment, for certain policies to be implementable, the cache will keep a copy of at least one PID in each cache line. A cache line may thus be a block, which may be a fixed size, containing the data transferred between memory and cache, a memory location, and at least one PID. The specific number of bits making up the PID may vary in different implementations, and can be chosen based on the particular characteristics of a given system.

Figure 2:
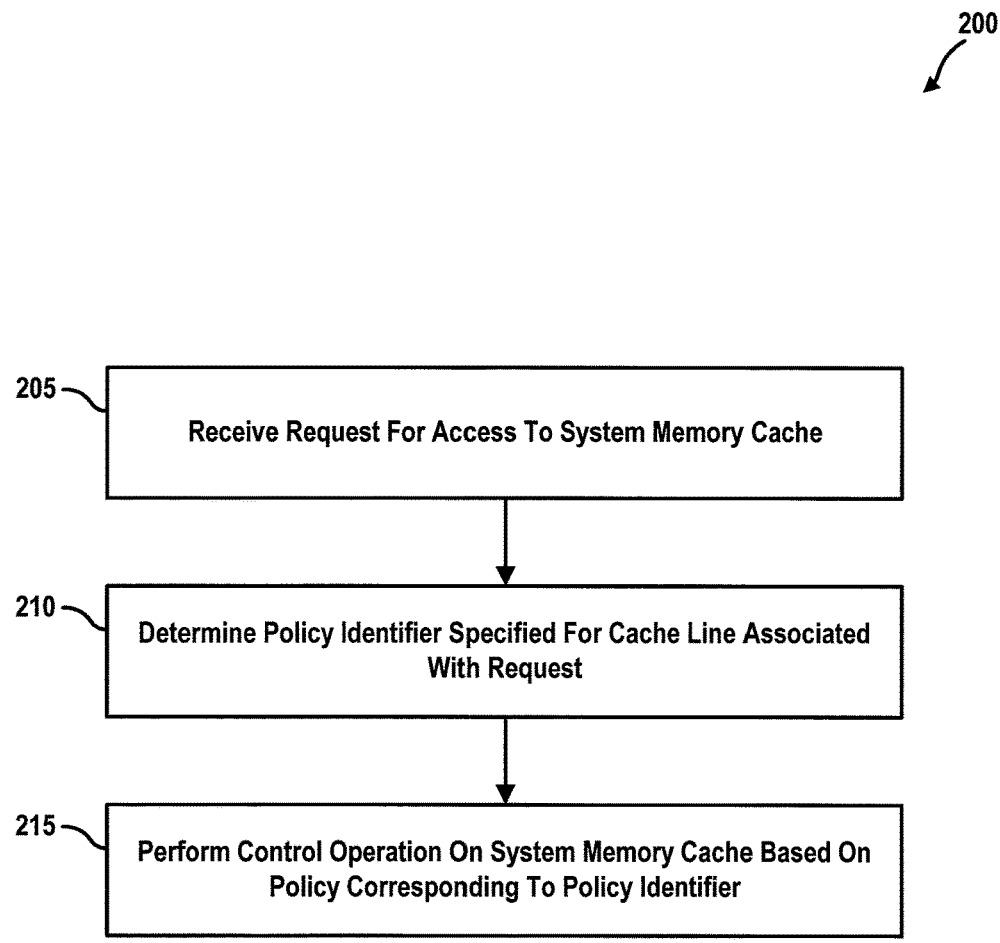
FIG. 2 is a flowchart illustrating an example method for controlling an operation of a system memory cache based on a policy identifier according to one or more embodiments described herein.

FIG. 2 is an example process 200 for controlling an operation of a system memory cache using one or more policy identifiers. At block 205, a request for access to a system memory cache (or system cache memory) may be received. The request for access received at block 205 may be a request for access to a particular cache line of the system memory cache. For example, the request for access may be a write request, read request, etc. to the cache line.

At block 210, a policy identifier (e.g., PID) specified for the cache line associated with the request for access (e.g., received at block 205) may be determined. For example, the PID may be determined based on the PID stored in the PID field in the cache line.

At block 215, at least one control operation may be performed on the system memory cache based on at least one policy corresponding to the policy identifier determined at block 210. For example, in accordance with at least one embodiment, the control operation performed on the system memory cache may be one of cache line filtering, cache line allocation, and cache line eviction. Additional details about these and other example operations that may be performed on the system memory cache based on a PID specified by a cache line will be provided in the sections that follow.

FIG. 3 illustrates example logical states 300 for a cache controller. As described above, in accordance with one or more embodiments, it is assumed for illustrative purposes that the configuration states needed to control various aspects and operations of the memory cache are stored centrally in the cache controller, although such states could be stored in a distributed manner. It should be noted that the following only describes example states above and beyond what is typically implemented in computer caches. In addition, the various names defined for the states are for illustrative purposes only, and are in no way intended to limit the scope of the present disclosure.

The following describes various features of the methods and systems for controlling cache management and operations in accordance with one or more embodiments of the present disclosure. The various logical states required by these features are illustrated in FIG. 3, and references may be made herein to corresponding fields to aid in the understanding of the features. The example control mechanisms that may be utilized in the methods and systems provided include, but are not limited to: filtering, allocation, quota control, and victim selection (dirty eviction), each of which will be described greater detail below. Without loss of generality, subsets of this functionality can be reasonably inferred by one of ordinary skill in the art.

Filtering

In accordance with one or more embodiments, the methods and systems described herein may include cache line filtering functionality (e.g., one or more filtering policies that may be implemented). For example, a hardware component (which may be referred to herein as "the blacklist") may perform a filtering operation by identifying cache lines that are under-utilized (or poorly utilized) and preventing such cache lines from subsequently being brought into a cache in the future. If enabled, the blacklist may be checked to see whether a particular cache line is likely to be fully utilized. Subsequent steps can then be taken once the result of the blacklist check is known.

Figure 4:
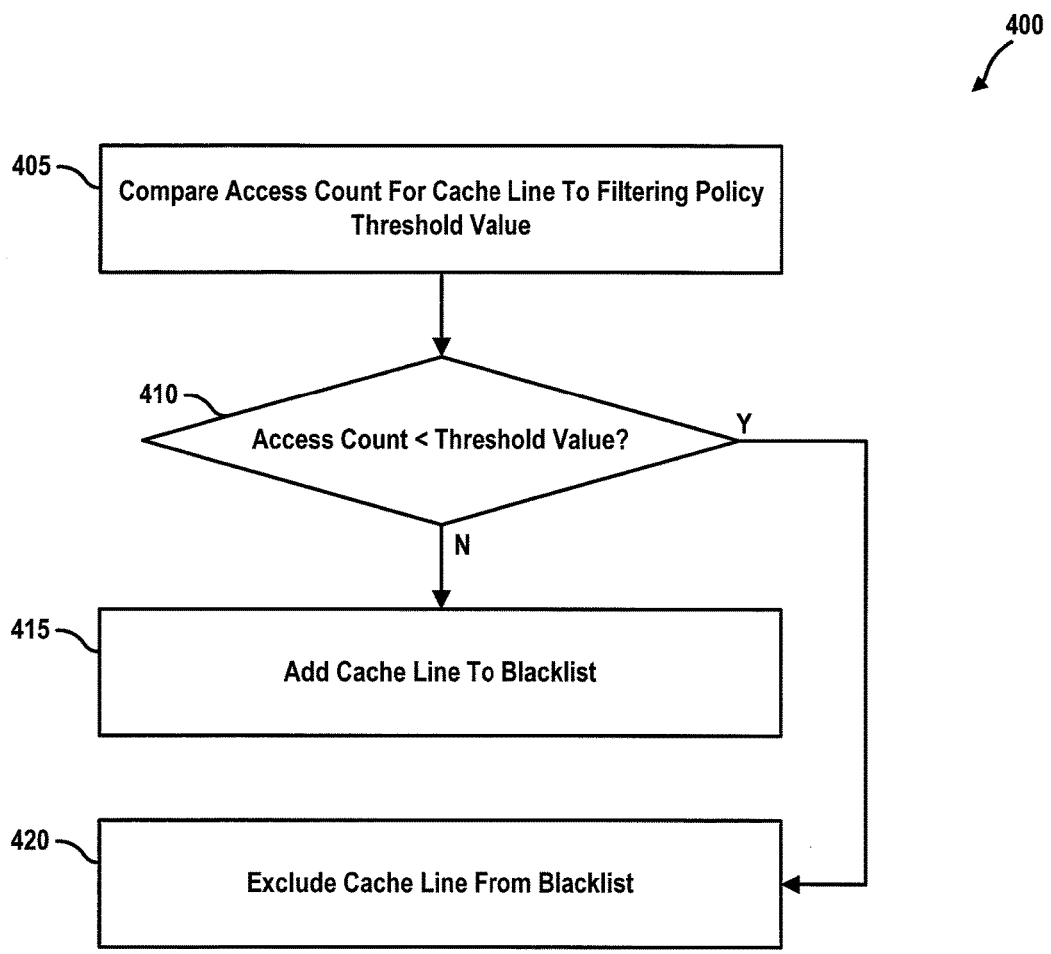
FIG. 4 is a flowchart illustrating an example method for identifying under-utilized cache lines according to one or more embodiments described herein.

FIG. 4 is an example process 400 for identifying under-utilized cache lines and training (e.g., building) the blacklist. In the following, reference may be made to both the example process 400 shown in FIG. 4, and also the example cache controller logical states shown in FIG. 3.

The blacklist may be trained when cache lines are evicted by examining one or more fields including, for example, access_count (332) and the aggregate number of subblocks accessed (e.g., by examining the individual accessed bits (340)). In at least one operation, the per-cache-line access_count (332) field may be compared (at block 405) to a per-PID threshold value (access_count_threshold (329)). If it is determined at block 410 that the access_count (332) for the cache line is less than the applicable filtering policy threshold value (329), the cache line may be added to the blacklist at block 415. On the other hand, if it is determined at block 410 that the access_count (332) for the cache line is not less than the filtering policy threshold value (329), the cache line may be left off or excluded from the blacklist at block 420.

In another example operation (not shown), the sum across the sub-blocks of a line of the accessed bits (340) fields may be compared to the blocks_used_threshold (318) value, and if the sum is less than the blocks_used_threshold (318), the line is added to the blacklist. It should be noted that the example operation (e.g., process) described above may be used together with, or separately from, the example process 400 shown in FIG. 4.

Figure 5:
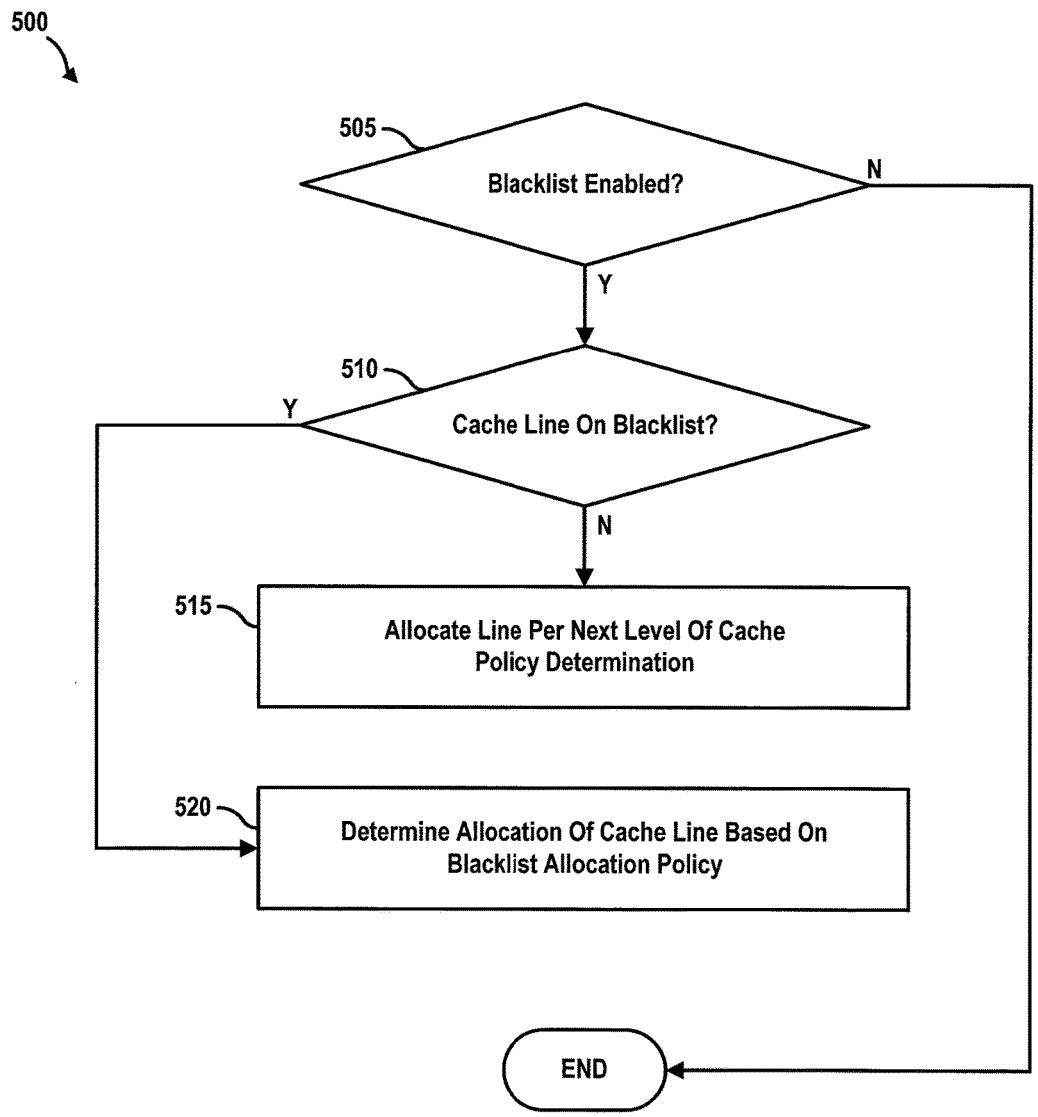
FIG. 5 is a flowchart illustrating an example method for determining allocation of a cache line based on a utilization level of the cache line according to one or more embodiments described herein.

FIG. 5 is an example process 500 for determining allocation of a cache line based on a determined utilization level of the cache line. For example, in accordance with at least one embodiment, the determination of whether to allocate a given line to a cache may be based on data obtained (e.g., received, retrieved, referenced, etc.) from an associated blacklist (as trained/built in accordance with the example process 400 shown in FIG. 4 and described in detail above). In the following, reference may be made to both the example process 500 shown in FIG. 5, and also the example cache controller logical states shown in FIG. 3.

At block 505, a determination may be made as to whether the blacklist is enabled for the particular PID. For example, the blacklist may be enabled or disabled on a per-PID basis by programming the use_blacklist bit (316). If it is determined at block 505 that the blacklist is not enabled (e.g., disabled), the process 500 may end. If the blacklist is found to be enabled at block 505, then at block 510, the blacklist may be checked (e.g., consulted) to determine whether the cache line to be loaded into the cache is present thereon.

If the cache line to be loaded into the cache is found not to be present on the blacklist (at block 510), the cache line may be allocated to the cache per next level of the cache policy determination at block 515. For example, if the blacklist filter is active and a line hits in the blacklist filter looking, it can force a "no allocation" condition. However, if the line misses in the blacklist filter, then the "next level" of policy may be evaluated (e.g., PID read/write allocation policy, quota determination, default cache policy, etc.), at block 515. This may include, for example, subsequent checks as to how to allocate the line based on other PID-based mechanisms outside of the blacklist filter (e.g., read-alloc, write-alloc, partial allocate on write, etc.).

On the other hand, if it is determined at block 510 that the cache line to be loaded into the cache is present on the blacklist, the cache controller will allocate based on the blacklist allocation policy. To do this, the cache controller may consult (e.g., check, analyze, review, etc.) a per-PID blacklist_alloc_policy (314) field to determine (at block 520) what allocation action, if any, to take. In accordance with one or more embodiments, the blacklist allocation policy may have multiple settings. For example, the allocation policy may include, but is not limited to, the following four settings (denoted in the below example as "0", "1", "2", and "3"):

no_alloc (0)—the cache line is not allocated at all in the particular cache and the address requested (e.g., by an appropriate requestor unit in a SoC) will be returned to the next level of cache at that cache's native line size.

128B (1), 256B (2), 512B (3)—only load a naturally-aligned portion of the overall cache line of the size specified by the field. Since these are multiples of typical line or subline size (e.g., 64B), this can be accomplished in numerous different ways known to those of ordinary skill in the art.

Once the blacklist has been consulted (e.g., checked, queried, analyzed, etc.) about whether to allocate a new line to the cache, one or more additional policies may apply or be carried-out, as described in detail below. If the cache line is not allocated as a result of the blacklist, further processing in the cache may not be necessary.

In accordance with at least one embodiment of the present disclosure, the filtering control/functionality may make use of a simplified bloom filter and may use one or more hash functions during the lookup and training (update) actions (e.g., at least two hash functions may be used). While the precise details of the hash functions may vary between implementations, whatever hash functions are used should be fast, efficient, and generate uncorrelated hash values. It should be noted that the bloom filter lookup function may be adjusted based on the final tuning of this parameter. As typical with bloom filters, one bit in the filter array is set (or checked) for each hash function implemented. In an example implementation, the relevant physical address bits are used as input to the hash functions.

In at least one embodiment, the filter implementation may include an aging mechanism (e.g., system, component, unit, etc.) where two copies (e.g., A and B) of the bloom filter bit arrays are used side by side (e.g., filterA[N_FILTER_BITS] for copy A and filter[N_FILTER_BITS] for copy B (312)). Any time a lookup is performed, both arrays (e.g., copy A and copy B) may be checked. If either array indicates a hit, the reference may be deemed to be blacklisted. Also, any time an update (training) is performed, both arrays may be updated.

In at least the present example implementation, the bloom filter may be periodically refreshed to prevent the filter from filling up with ones. For example, a corresponding application or program (e.g., computer software) may specify a "refresh" cycle (period) and separate counters for the A and B arrays may also be maintained (e.g., bloom_refresh_cycles_counterA and bloom_refresh_cycles_counterB (310)). When either such counter is decremented to zero, the corresponding bit array (A or B) is cleared and the counter is reset. The bloom filter may also be controlled by specifying a limit (e.g., bloom_refresh_cycles_limit (311)) on the number of times the bloom filter may be refreshed. It should be noted that one key to aging is to program the initial value of the A counter (countdown) to be equal to the refresh period and the B array to be initialized to half of the refresh period. For example, if the bloom filter is to be cleared every 100 cycles, copy A of the array is cleared at 100 cycles, 200 cycles, 300 cycles, etc., while copy B of the array is cleared at 50 cycles, 150 cycles, 250 cycles, etc. The rate at which either of the counters (e.g., counter for A and/or counter for B) counts should be adjusted based on experimentation with particular implementations and/or particular workloads of interest to the chip designer. It is preferable not to hardcode the appropriate aging values ahead of time, and thus the methods and systems of the present disclosure allow for adjusting (e.g., by hardware and/or software designers) the threshold appropriately (e.g., based on experimentation) once the target system into which the chip will be placed and the workloads the chip will run are decided.

It should be understood that the example aging mechanism described above is one example of many such mechanisms suitable for use with the bloom filter in accordance with at least one embodiment of the present disclosure. Various other aging systems or techniques may similarly be used in addition to or instead of the example aging approach described above. For example, another aging mechanism is based on the percentage of bits set in the filter arrays (e.g., as they pass a certain threshold, the array is cleared).

The filtering control/functionality of the methods and systems described herein allows graceful "throttling" of cache lines that exhibit poor re-use or for which only a subset of the bytes brought in are eventually used (e.g., those lines that would make sub-optimal use of the cache). For example, it is possible to "ban" such cache lines outright (e.g., no_alloc under blacklist_alloc_policy (314) in the example shown in FIG. 3) or just allow the lines to load a subblock surrounding the physical address (PA) of the address that missed. While such techniques still consume cache capacity, they reduce the amount of potentially unnecessary bandwidth (BW) consumed between main memory (typically, for example, dynamic random access memory (DRAM)). Throttling in this manner also means that if the blacklist function is too conservative, good lines are not entirely prevented from getting into the cache.

Allocation Control

In accordance with one or more embodiments of the present disclosure, the methods and systems provided may include one or more allocation controls or functionalities (e.g., one or more allocation control policies that may be implemented). For example, allocation control may be performed whenever all or part of a cache line is to be allocated in a given cache. As with the filtering controls described above, the various allocation controls and features of the present disclosure are managed/controllable on a per-PID basis, and PIDs may be associable with individual pages in the various system MMUs/TLBs or with specific requesting sub-units (e.g., CPU0, CPU1, GPU core 0, GPU shared core 5, video encoder, video decoder, any bus master, and the like).

The following describes various features of allocation control logic, with continued reference to FIG. 3. When set, allocate_on_read (322) causes read requests to allocate lines in the cache, while allocate_on_write (323) causes write requests to allocate lines in the cache. Setting both bits (e.g., allocate_on_read (322) and allocate_on_write (323)) allocates all requests, and clearing both bits prevents allocation by requests from the given PID (e.g., PID (334)).

In accordance with at least one embodiment, when both partial_allocate_on_write (324) and allocate_on_write (322) bits are set, write misses may only allocate a single subblock. In such a scenario, if subsequent reads are made to the cache line, the remaining subblocks will be loaded. Subsequent writes will allocate further subblocks, but a read is needed to load the entire block. For non-blacklisted (e.g., references that were not excluded due to checking the blacklist or for which the blacklist was not consulted at all) allocations, the allocation control logic provides the ability to load only a subset of subblocks of the cache line (as indicated, for example, by the subblock_size field (328)). Additionally, the control logic allows applicable programming (e.g., software) to configure a particular PID such that, for all cache lines controlled by that PID, entire lines will only be loaded after a certain number of accesses are made to that line (as indicated, for example, by the access_count_threshold field (329)).

Quota Control

Figure 6:
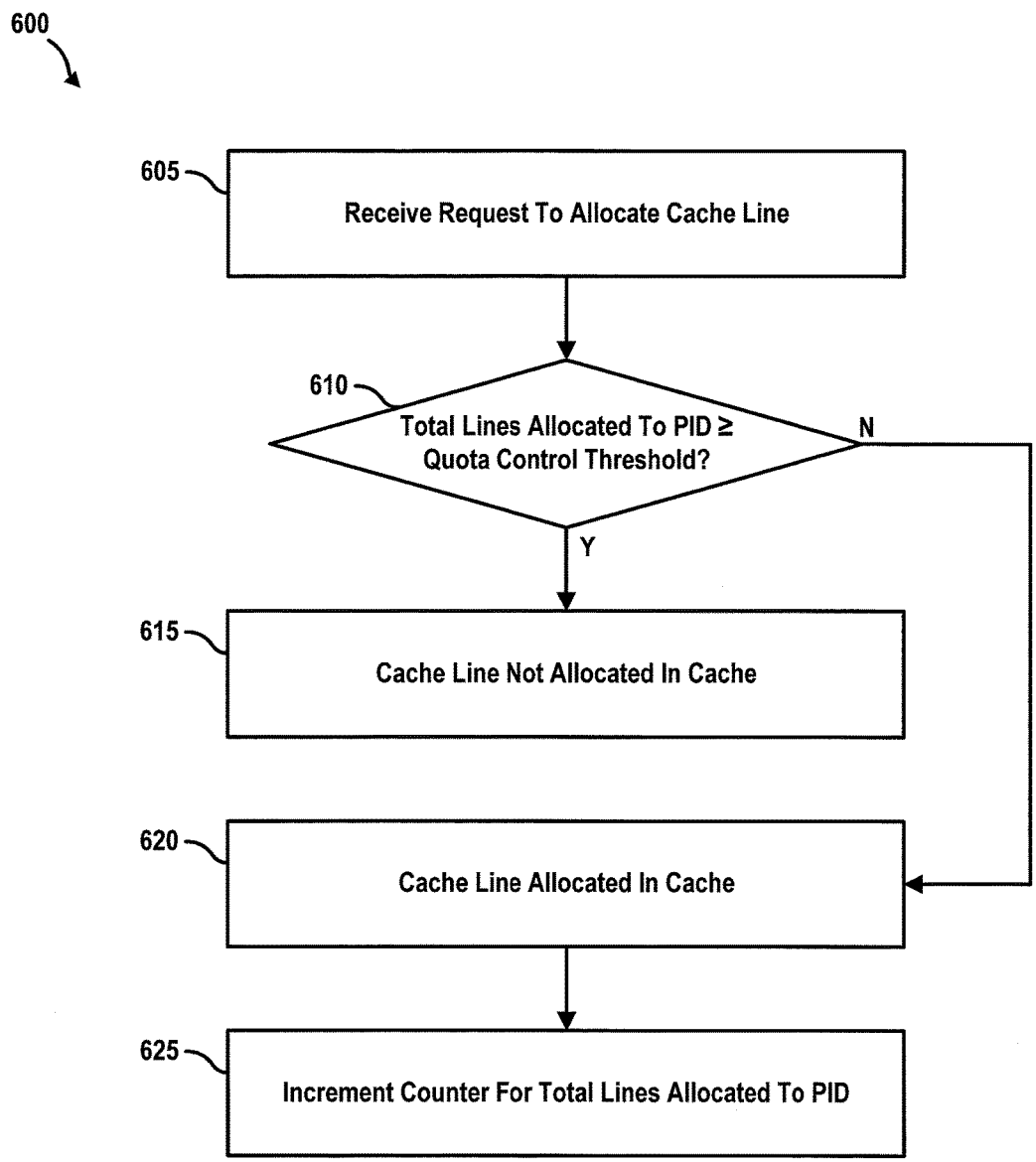
FIG. 6 is a flowchart illustrating an example method for controlling cache lines allocated to any given policy identifier according to one or more embodiments described herein.

FIG. 6 is an example process 600 for controlling cache lines allocated to PIDs. For example, in accordance with one or more embodiments described herein, the methods and systems of the present disclosure may include one or more quota controls or functionalities (e.g., one or more quota control policies that may be implemented) designed to address a variety of situations involving cache lines and the assignment of PIDs. In the following, reference may be made to both the example process 600 shown in FIG. 6, and also the example cache controller logical states shown in FIG. 3.

In at least one example, a quota control policy may prevent any given PID from acquiring more than line_count_max (326) lines of a given cache. When the quota control threshold as provided by line_count_max (326) is reached for a particular PID, no further cache lines may be allocated to the PID, and the request will be forwarded to the next level in the memory hierarchy of the applicable system.

At block 605, an allocation request (e.g., a request to allocate a cache line to a given PID) may be received at the cache. In accordance with at least one embodiment, any time an allocation request is received at the cache, the quota control threshold applicable to the given PID (e.g., as provided by the line_count_max (326) field) may be consulted at block 610.

If it is determined at block 610 that the total number of lines already allocated to the given PID (e.g., as provided by the line_count (327) field) is, for example, greater than or equal to the value specified by the quota control threshold (line_count_max (326) field), then at block 615 the line may not be allocated in that particular cache (it should be noted, however, that the line may be cached at a higher or lower level of the hierarchy).

If it is determined at block 610 that the total number of lines already allocated to the given PID (e.g., as provided by the line_count (327) field) is less than the value specified by the quota control threshold (line_count_max (326) field), then at block 620 the line may be allocated in the cache. Each time a line is allocated for a given PID, a per-PID counter (e.g., line_count (327)) may be incremented (and decremented similarly on evictions), for example, at block 625.

In accordance with at least one embodiment, each line in a cache holds (e.g., stores, maintains, etc.) a copy of the PID that governs its behavior. Any time a cache is accessed, the PID field (334) of the accessed line may be updated to the PID of the latest access, if they are different. The process of transferring ownership of the PID is particularly relevant for lines that are generated by one hardware device and subsequently consumed by another hardware device, and is significant in terms of effective management of the cache.

When the PID of a cache line changes, the cache controller updates the line_count (327) (e.g., the number of lines already allocated) for the prior and new PIDs appropriately in such cases. Therefore, it may be possible for the new PID's line_count (327) to exceed the threshold provided by line_count_max (326) as a result of a cache line's ownership changing from one PID to another.

In accordance with at least one embodiment, the cache may implement one or more advanced policies to address over-quota conditions. For example, in order to avoid thrashing in the case where a cache line is shared by multiple (e.g., two) PIDs and one of the PIDs is exceeding its quota (e.g., as provided by line_count_max (326)), the cache may implement either of the following example policies: (1) keep a count of the number of times the cache line is accessed and assign the line's PID according to the PID under which the cache line is accessed most; or (2) assign the cache line to the PID with the most quota or headroom. It should be noted that if the new PID is over quota, leaving the line in the original PID is an alternative to invalidating the line or victimizing other lines in the target PID.

Victim Selection Control

In accordance with one or more embodiments, the methods and systems of the present disclosure may include one or more victim selection (e.g., dirty eviction) controls or functionalities (e.g., one or more victim selection control policies that may be implemented). For example, victim_policy may be implemented, which is a policy that controls how the cache controller selects victims (e.g., cache lines to be evicted from the cache) when room is needed in the cache for a new allocation. This control may be used, for example, in conjunction with the quota control policies described above when a given PID's quota is reached to control/prevent one PID from thrashing lines from quotas of other PIDs. In at least one example implementation:

victim_policy=0: a policy/PID can be programmed to control the victim selection process from the global selection of possible victims (e.g., typically some type of least recently used (LRU) state); and victim_policy=1: selection may only be from those victim candidates from within the same PID.

In accordance with one or more other embodiments of the present disclosure, a cache management and control system and/or apparatus may be designed to achieve similar goals as the cache management and control systems and apparatus described above, but while using one or more different state storage, allocation, locking, and/or eviction policies.

For example, such a cache management and control apparatus may be designed (1) to provide a mechanism to isolate working sets between different hardware agents (e.g., CPU, I/O devices, etc., in a SoC environment), and/or (2) to provide a mechanism to avoid wasted external DRAM bandwidth due to sparsely referenced large cache lines (in other words, keep the sparsely referenced lines out of a cache).

It should be understood that in accordance with these one or more other embodiments, the cache management and control apparatus and/or system may include features and functionalities similar to some or all of the features and functionalities of the apparatus and systems described above and illustrated in FIGS. 1-7. It should also be noted that the methods, systems, and apparatus for cache management and control described above (and illustrated in FIGS. 1-7) may optionally include one or more of the additional and/or alternative features described in detail below.

The cache management and control apparatus described in the following shares commonality with the example management and control apparatuses described above, except that it includes the following additional/alternative features: (1) state is distributed across the machine and shadow copies of PID-based policy storage are kept in a central location; and (2) this approach provides for line-level locking and write-back policies.

For example, in accordance with at least one embodiment, the following structures may be built in a cache to control allocation:

(i) At level of cache, one copy of this per stream (e.g., 16 streams assumed):

(a) shadow control registers (e.g., 32-bits)

(1) quota (# of cache line) (e.g., 16-bits, $2^{16} \times 4$ KB cache line size);

(2) mode (e.g., 1-bit); 0→1 is enable; 1→0 is disable (it should be noted that if disabled, clearance option (described below) may determine what to do); and (3) clearance option (1-bit); if 0: invalidate the clean line, write back the dirty line; if 1: invalidate the line regardless of the clean or dirty status.

(b) status registers (e.g., 32-bits)

(1) usage (# of cache line) (e.g., 16-bits, 2^16×4 KB cache line size);

(2) in-use (e.g., 1-bit); 0→1 when mode bit is set; 1→0 when the clearance process is done.

(ii) At level of a cache line:

(a) locked (e.g., 1-bit);

(b) PID;

(c) reference count (e.g., 6-bits for up to 6'd63) for LFU (least-frequently used); and (d) reference history (hierarchical hash table) for LRU (least recently used).

(iii) At level of 64B sub-cache lines:

(a) invalid (2'b00), valid and clean (2'b01), valid and dirty (2'b11).

It should be noted that the precise sizes of counters, structures, and/or buses may be determined by the underlying cache that the apparatus and control system is applied to. The present example is provided for a DRAM cache with large line sizes (4 KB for purposes of the present description, although the precise size may vary).

In addition, in accordance with at least one embodiment, an example agent (e.g., CPU, I/O device, etc.) controller state may be as follows:

(i) 16 stream-ID L4 main control registers (e.g., 32-bit):

(a) L4 quota (# of cache line) (e.g., 16-bit, 2^16×4 KB cache line size);

(b) Stream ID control enable (1-bit);

(c) L4 allocation policy:

(1) allocate on read miss (1-bit);

(2) allocate on write miss (1-bit);

(3) allocate on partial write miss (1-bit);

(4) allocate N-sub-cacheline (where N=1 means 64B at a time);

(5) allocate after N-miss (where N=1 means allocate right after the first miss); and (6) allocate and lock (1-bit); once locked, cannot be replaced.

(d) Replacement policy (e.g., LRU versus LFU).

(ii) 16 stream-ID L3 main control registers (e.g., 32-bit):

(a) L3 quota (# of cache line) (e.g., 16-bit, 2^16×64B cache line size);

(b) Stream ID control enable (1-bit)

(c) L3 allocation policy:

(1) allocate on read miss (1-bit);

(2) allocate on write miss (1-bit);

(3) de-allocate on hit (exclusive to L2C, 1-bit);

(4) allocate and lock (1-bit); once locked, cannot be replaced.

(d) Replacement policy (e.g., LRU).

In accordance with one or more embodiments, the methods, systems, and apparatus for cache management and control may be modified in one or more ways to optionally include other features and/or functionalities in addition to or instead of those described above. For example, the system or apparatus may be configured with additional controls on the cache. Such controls may include, for example, a programmable threshold for starting dirty writeback, and/or the ability to "lock" the cache to prevent new allocations (e.g., if thrashing is detected).

In another example, it may be possible to use "chicken bits" to allow only certain agents to use the cache. Primary candidates for such agents that are allowed to use the cache may include, for example, the GPU, Display Controller, ISP, and Video Controller. In such an implementation, the CPU (or other agents such as, for example, ZRAM) would not be permitted to allocate into the cache. In one example, cache hardware could match on a set of IDs and prevent allocation. Those agents that are prevented from allocating to the cache could, however, still read from the cache. Some non-exhaustive advantages of limiting allocation ability in this manner include keeping hardware relatively simple and avoiding complex policy decisions.

Another example includes adding performance counters to the cache to allow a computer program (e.g., software) to determine when a particular agent is thrashing the cache and have a "bypass mode" to prevent new allocations. A non-limiting and non-exhaustive list of example counters that could be used in such a manner includes:

(i) count the number of allocations and/or number of dirty evictions over a set interval of time and interrupt if the number exceeds a threshold;

(ii) count ratio of bandwidth in to bandwidth out (a measure of cache effectiveness);

(iii) count ratio of dirty cache lines to clean cache lines; and (iv) count ratio of dirty eviction to allocation.

It should be noted that to use performance counters in the above manner, it may be necessary to have the ability to slice counters by agent, and thus it may be necessary to have a few counters that are associated with a particular set of agents. In one example, if the threshold is exceeded, software could be configured to temporarily lock the cache (e.g., prevent new allocations until the previously allocated/locked lines are explicitly unlocked).

Figure 7:
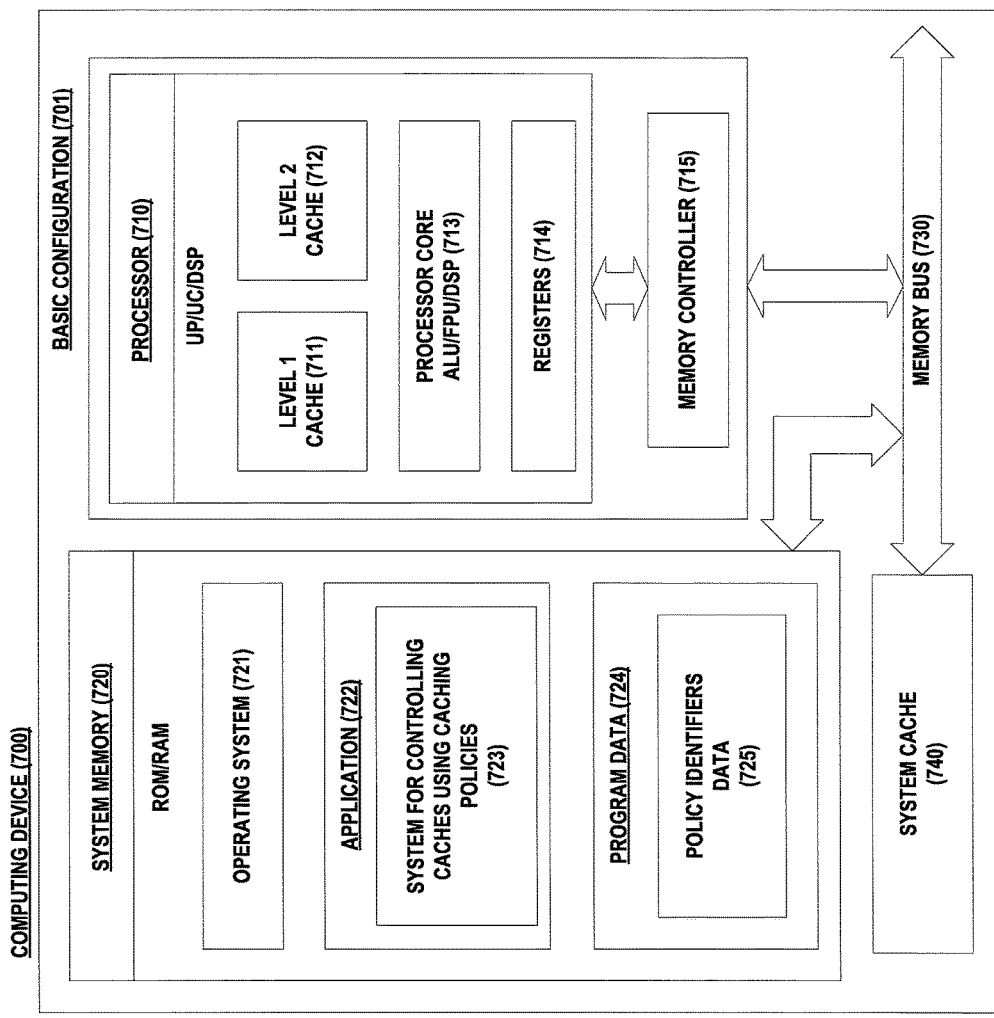
FIG. 7 is a block diagram illustrating an example computing device arranged for controlling a memory cache using caching policies specific to the cache according to one or more embodiments described herein.

FIG. 7 is a high-level block diagram of an exemplary computing device (700) that is arranged for controlling a memory cache using caching policies specific to the cache in accordance with one or more embodiments described herein. In a very basic configuration (701), the computing device (700) typically includes one or more processors (710), a system memory (720), and a system cache (740). A memory bus (730) can be used for communicating between the processor (710) and the system memory (720). Other hardware can be connected to the processor (710), the memory (720), the memory bus (730), and/or the system cache (740).

Depending on the desired configuration, the processor (710) can be of any type including but not limited to a microprocessor (µP), a microcontroller (µC), a digital signal processor (DSP), or the like, or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or the like, or any combination thereof. A memory controller (715) can also be used with the processor (710), or in some implementations the memory controller (715) can be an internal part of the processor (710). In one or more other implementations, the memory controller (715) may be used with the system cache (740) (e.g., as a cache controller configured with the various features and functionalities described above).

Depending on the desired configuration, the system memory (720) can be of any type including but not limited to volatile memory (such as RAM), non-volatile memory (such as ROM, flash memory, etc.), or any combination thereof. System memory (720) typically includes an operating system (721), one or more applications (722), and program data (724). The application (722) may include a system for controlling one or more caches using caching policies (723). In accordance with at least one embodiment of the present disclosure, the system for controlling one or more caches using caching policies (723) is designed to provide for detailed control over the behavior (e.g., operations, functionalities, etc.) of such system level caches.

Program Data (724) may include stored instructions that, when executed by the one or more processing devices, implement a system (723) and method for controlling one or more caches using caching policies. Additionally, in accordance with at least one embodiment, program data (724) may include policy identifier (PID) data (725), which may relate to, for example, a name (e.g., identifier, number, etc.) given or assigned to a collection of parameters that control the behavior of a set of cache management structures. In accordance with at least some embodiments, the application (722) can be arranged to operate with program data (724) on an operating system (721).

The computing device (700) can have additional features or functionality, and additional interfaces to facilitate communications between the basic configuration (701) and any required devices and interfaces.

In accordance with at least one embodiment, system cache (740) may be used by multiple different hardware components or units. For example, in a SoC design (e.g., used in portable devices such as phones, tablets, etc.), system cache (740) may be a common cache shared between many different hardware units of the system.

System memory (720) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. In addition, the computing device (700) may also be implemented as a personal computer including both laptop computer and non-laptop computer configurations, one or more servers, Internet-of-Things systems, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Unless expressly limited by the respective context, where used in the present disclosure, the term "generating" indicates any of its ordinary meanings, such as, for example, computing or otherwise producing, the term "calculating" indicates any of its ordinary meanings, such as, for example, computing, evaluating, estimating, and/or selecting from a plurality of values, the term "obtaining" indicates any of its ordinary meanings, such as, for example, receiving (e.g., from an external device), deriving, calculating, and/or retrieving (e.g., from an array of storage elements), and the term "selecting" indicates any of its ordinary meanings, such as, for example, identifying, indicating, applying, and/or using at least one, and fewer than all, of a set of two or more.

The term "comprising," where it is used in the present disclosure, including the claims, does not exclude other elements or operations. The term "based on" (e.g., "A is based on B") is used in the present disclosure to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including, for example, "in response to at least."

It should be understood that, unless indicated otherwise, any disclosure herein of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). Where the term "configuration" is used, it may be in reference to a method, system, and/or apparatus as indicated by the particular context. The terms "method," "process," "technique," and "operation" are used generically and interchangeably unless otherwise indicated by the particular context. Similarly, the terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including, for example, "a group of elements that interact to serve a common purpose."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method comprising:
   receiving, from a requestor, a request for access to a system level memory cache;
   determining a policy identifier specified for a cache line associated with the request for access, the policy identifier providing insight into the requestor and corresponding to at least one policy for controlling operations of the system level memory cache; and
   performing a control operation on the system level memory cache based on the at least one policy corresponding to the policy identifier, wherein the control operation includes cache line filtering, and the cache line filtering includes:
      identifying that one or more cache lines have utilization levels below a threshold value; and
      preventing the one or more identified cache lines from being subsequently loaded into the system level memory cache.

2. The method of claim 1, wherein the control operation is further one of cache line allocation, and cache line eviction.

3. The method of claim 1, wherein the policy identifier is included in the request for access using physical address bits.

4. The method of claim 1, wherein the requestor comprises computational engines, and wherein the policy identifier is associated with one or more of:
   pages in a memory management unit or a translation lookaside buffer; or
   said computational engines.

5. The method of claim 1, further comprising:
   adding the one or more identified cache lines to a set of cache lines prevented from being loaded into the system level memory cache.

6. The method of claim 1, wherein identifying that one or more cache lines have utilization levels below a threshold value includes:
   comparing an access count of number of times the one or more identified cache lines are accessed to a threshold count associated with a policy of the cache line filtering; and
   responsive to the access count being less than the threshold count, adding the one or more identified cache lines to a set of cache lines prevented from being loaded into the system level memory cache.

7. The method of claim 1, wherein identifying that one or more cache lines have utilization levels below a threshold value includes:
   examining individual accessed bits of subblocks of the one or more cache lines to determine a number of subblocks accessed within the one or more cache lines;
   comparing the number of subblocks accessed to a threshold value associated with a policy of the cache line filtering; and
   responsive to the number of subblocks accessed being less than the threshold value, adding the one or more cache lines to a set of cache lines prevented from being loaded into the system level memory cache.

8. The method of claim 1, wherein the cache line filtering further includes:
   using a bloom filter to filter out one or more lines of the system level memory cache based on the one or more identified cache lines; and
   adding the one or more filtered out cache lines to a set of cache lines prevented from being loaded into the system level memory cache.

9. The method of claim 1, wherein the policy identifier specified for the cache line is one of a plurality of policy identifiers, and each cache line in the system level memory cache specifies one policy identifier of the plurality.

10. The method of claim 9, wherein the policy identifier specified for each cache line is based on a source associated with a most recent request for access to the cache line.

11. A system comprising:
    system cache memory;
    system memory;
    at least one processor coupled to the system memory and the system cache memory; and
    a non-transitory computer-readable medium associated with the at least one processor, the non-transitory medium having instructions stored thereon that, when executed by the at least one processor, causes the at least one processor to:
       receive a request from a requestor for access to the system cache memory;
       determine a policy identifier specified for a cache line associated with the request for access, wherein the policy identifier provides insight into the requestor and corresponds to at least one policy for controlling operations of the system cache memory; and
       perform a control operation on the system cache memory based on the at least one policy corresponding to the policy identifier, wherein the control operation includes cache line filtering, and the at least one processor is further caused to:
          identify that one or more cache lines have utilization levels below a threshold value, and
          prevent the one or more identified cache lines from being subsequently loaded into the system cache memory.

12. The system of claim 11, wherein the policy identifier indexes a table containing a plurality of policies for controlling operations of the system cache memory.

13. The system of claim 11, wherein the requestor comprises a hardware device, and wherein the request for access includes a policy identifier associated with said hardware device, and the at least one processor is further caused to:
    determine that the policy identifier included in the request for access matches the policy identifier specified for the cache line associated with the request for access.

14. The system of claim 11, wherein the requestor comprises computations engines, and wherein the policy identifier is associated with one or more of:
    pages in a memory management unit or a translation lookaside buffer of the system; or
    said computational engines.

15. The system of claim 11, wherein the at least one processor is further caused to add the one or more identified cache lines to a set of cache lines prevented from being loaded into the system cache memory.

16. The system of claim 11, wherein the at least one processor is further caused to:
- compare an access count of number of times the one or more identified cache lines are accessed to a threshold count associated with a policy of the cache line filtering; and
- responsive to the access count being less than the threshold count, add the one or more identified cache lines to a set of cache lines prevented from being loaded into the system cache memory.

17. The system of claim 11, wherein the at least one processor is further caused to:
- examine individual accessed bits of subblocks of the one or more cache lines to determine a number of subblocks accessed within the one or more cache lines;
- compare the number of subblocks accessed to a threshold value associated with a policy of the cache line filtering; and
- responsive to the number of subblocks accessed being less than the threshold value, add the one or more cache lines to a set of cache lines prevented from being loaded into the system cache memory.

18. The system of claim 11, wherein the at least one processor is further caused to:
- use a bloom filter to filter out one or more lines of the system cache memory based on the one or more identified cache lines; and
- add the one or more filtered out cache lines to a set of cache lines prevented from being loaded into the system cache memory.

\* \* \* \* \*